United States Patent
Sarlioglu et al.

(10) Patent No.: US 6,847,194 B2
(45) Date of Patent: Jan. 25, 2005

(54) ELECTRIC START FOR A PRIME MOVER

(75) Inventors: Bulent Sarlioglu, Torrance, CA (US); Colin E. Huggett, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 225 days.

(21) Appl. No.: 10/247,615

(22) Filed: Sep. 20, 2002

(65) Prior Publication Data

US 2004/0057257 A1 Mar. 25, 2004

(51) Int. Cl.[7] .............................. H02P 3/00; G05F 1/70
(52) U.S. Cl. ..................................... 322/10; 323/205
(58) Field of Search ............................. 322/10, 11, 15, 322/20, 22–25, 29, 32, 44; 323/205, 207, 208, 212–218; 363/149, 152, 153; 318/136, 140, 146, 147, 157, 158, 431

(56) References Cited

U.S. PATENT DOCUMENTS

| | | | |
|---|---|---|---|
| 5,036,267 A | 7/1991 | Markunas et al. ............ 322/10 |
| 5,428,275 A | 6/1995 | Carr et al. ................... 318/146 |
| 5,493,201 A | 2/1996 | Baker ........................... 322/10 |
| 5,594,322 A | * | 1/1997 | Rozman et al. ............... 322/10 |
| 5,930,134 A | * | 7/1999 | Glennon ..................... 363/127 |
| 6,011,377 A | 1/2000 | Heglund et al. ............ 318/701 |
| 6,035,626 A | 3/2000 | Wahl et al. ................ 60/39.02 |
| 6,301,136 B1 | 10/2001 | Huggett et al. ............... 363/95 |

* cited by examiner

Primary Examiner—Matthew V. Nguyen
(74) Attorney, Agent, or Firm—Oral Caglor, Esq.

(57) ABSTRACT

A system and method for using reluctance torque or a combination of both reluctance and reaction torque components of an attached synchronous machine (102) to accelerate a prime mover (116), such as a gas turbine engine, within a desired start time. The system selects a mode of starting operation, and thereafter applies reluctance torque through a synchronous machine (102) armature winding (102A) excitation as a single, sufficient starting force in a first mode, or staged reluctance and reaction torque through the additional excitation of the synchronous machine (102) field winding (102B) excitation in a second mode, using existing power electronics and controls.

22 Claims, 8 Drawing Sheets

ELECTRIC START FOR A PRIME MOVER

CROSS-REFERENCE TO RELATED APPLICATIONS

Related subject matter is disclosed in a U.S. Patent Application of Sarlioglu et al. entitled "Improved Torque Generation For Salient-Pole Synchronous Machine Start-Up Of A Prime Mover", U.S. Pat. No. 10/247,679, filed on Sep. 20, 2002 and in a U.S. Patent Application of Sarlioglu et al., entitled "A Method And System For Providing Single-Phase Excitation Techniques To A Start Exciter In A Generator System", U.S. Pat. No. 10/315,051, filed on Dec. 10, 2002, the entire content of each being incorporated herein by reference.

FIELD OF THE INVENTION

The present invention relates to the start-up of prime movers in starter/generator systems, such as a gas turbine engine as used in aerospace applications. Specifically, the invention relates to a control system and method for using only the reluctance torque or combination of both reluctance and reaction torque of an attached synchronous machine to accelerate a prime mover within a desired start time.

BACKGROUND OF THE INVENTION

In a traditional system of starting a prime mover, such as a gas turbine engine, a starter motor is used to apply torque to the turbine engine's shaft for some period. As described in U.S. Pat. No. 6,035,626 issued to Wahl et al., the entire content of which being incorporated herein by reference, the gas turbine engine includes a compressor, a combustor, and a turbine. The compressor and the turbine are mounted for rotation on a shaft, which may also be used to drive other components, such as a gearbox and various accessories, such as an alternating current (AC) electric generator and lube pump.

As described in the Wahl Patent, as the shaft starts to rotate, air is inducted into the compressor, compressed and then discharged in the combustor. Concurrently, the engine's fuel control system feeds fuel into the combustor in accordance with a preprogrammed fuel schedule to precisely maintain the proper fuel to air ratio in the combustor. At a rotational speed of about 10 to 20 percent of the engine's operating speed, the conditions in the combustor become such that the fuel/air mixture can be ignited at a stage commonly known as "light-off". Should the fuel to air ratio be either too rich or too lean, light-off will not occur and the engine will experience a "hung start". After light-off the starter motor torque is augmented by torque from the engine's turbine. At about 50 percent of operating speed the starter motor is shut off. The engine is now self-sustaining and accelerates itself to operating speed.

Typically, direct current (DC) motors are used as starter motors in such applications. However, as explained in the Wahl Patent, for a given power supply DC motor torque-versus-speed characteristics are fixed. Consequently, a DC starter motor must be sized to produce starting torque under the worst condition with the greatest engine drag, which is typically a cold soaked engine. Such DC starter motors are of a type commonly referred to as brush type motors, and have severe reliability problems due to the brush-commutator interface that can deteriorate rapidly due to high altitude starts. Further, the speed-torque profile of the motor is fixed and cannot be adjusted.

One solution to overcome the disadvantages associated with DC motors discussed in the Wahl Patent includes the use of the prime mover's AC generator as an AC starter motor. Generators, in combination with power converters, are commonly referred to as starter/generators (S/Gs). Furthermore, as pointed out in the Wahl Patent, the power converter can regulate the power consumption of the starter/generator from either a DC or AC source, therefore the converter can be controlled to provide any desired starting torque characteristic or torque-versus-speed profile. However, such systems are typically complex in their implementation, since main field flux must be provided at zero speed through the exciter machine and an associated inverter, and current in the main machine stator winding must be independently controlled via a second inverter to provide torque.

Accordingly, a need exists for a control system using an attached synchronous machine to accelerate a prime mover, such as a gas turbine engine without the additional complexities of extra control or power electronics for the AC excitation of the field winding of the exciter circuit during the engine start-up.

SUMMARY OF THE PREFERRED EMBODIMENTS

An object of the present invention is to provide a synchronous machine which may be run in motoring mode of operation for the start-up of an attached prime mover, such as a gas turbine.

Another object of the present invention is to provide reluctance torque, generated by a synchronous machine, to start an attached prime mover.

Still another object of the present invention to provide reluctance torque in a first stage, and both reluctance and reactance torque in a second stage, to start an attached prime mover.

Still another object of the present invention is to provide a control system to direct the operation of the starting system.

These and other objects are substantially achieved by providing a system and method for using only reluctance torque or a combination of both reluctance and reaction torque of an attached synchronous machine to accelerate a gas turbine within a desired start time. In one embodiment, the system applies reluctance torque where only the armature of the main machine is supplied with AC voltages using a plural phase converter with controls and there is no excitation of the field winding of the exciter machine.

In another embodiment, the system uses the reluctance torque and additional reaction torque through DC field excitation of the exciter machine. Initially, at zero speed, DC current is applied to the field of the exciter, but zero voltage is induced in the rotor windings. As the speed of the machine increases, voltage is induced in the rotor of the exciter machine, which is applied via a rectifier mounted on the rotor as a DC voltage to the main machine field winding mounted on the rotating assembly. As speed increases, this applied voltage increases, increasing the main field flux.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

The present invention described below systematically uses either reluctance torque or a combination of both reluctance and reaction torque of a synchronous machine to minimize or optimize the required complexity of a starting system when applied to accelerate a prime mover, such as a gas turbine engine. In a first embodiment, only reluctance torque of the synchronous machine is used to accelerate the attached gas turbine. This embodiment would be preferred in applications where the reluctance torque is sufficient to cause "break-away" at zero speed and accelerate the gas turbine within a desired start time.

In a second embodiment of the present invention, starting the gas turbine initially uses reluctance torque only and at some point during start-up, DC field excitation is applied to the exciter stator winding of the synchronous machine. Although DC field excitation is typically applied at some point during start-up in the second embodiment, it can be applied at any time including directly at start-up. In the second embodiment, both reluctance and reaction torque is used to accelerate the attached gas turbine. This embodiment uses the power electronics and controls already existing for the field winding of the exciter machine, therefore no additional hardware or winding configurations for the field winding of the exciter machine are required. As known to those skilled in the art however, a DC source such as a battery may be required to provide a DC voltage level for the exciter field winding during periods where the permanent magnet generator output for the system is at insufficient levels for starting.

Figure 1A:
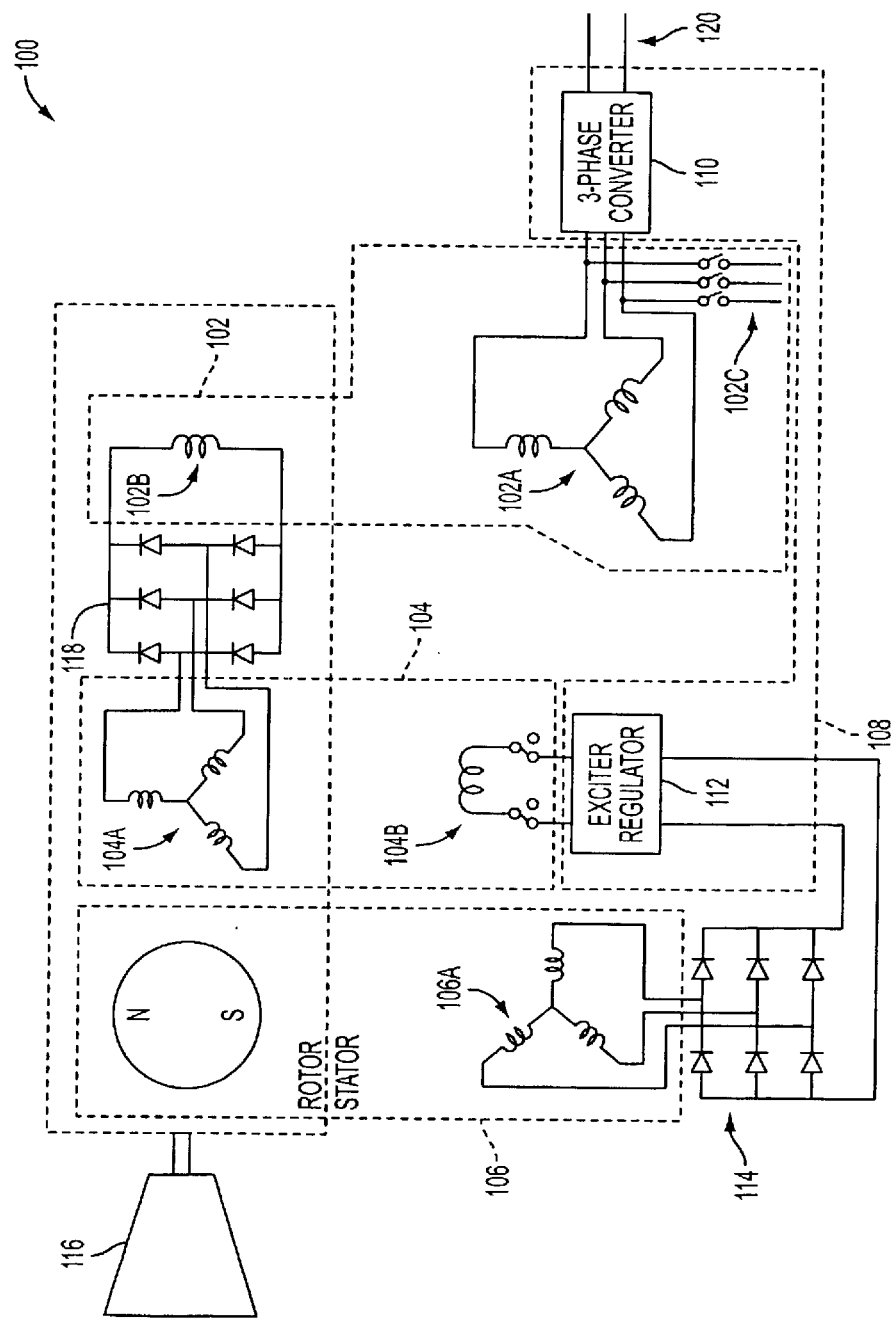
FIG. 1A is a block diagram illustrating an example of a starting system in accordance with an embodiment of the present invention.

A block diagram illustrating an example of a system (100) for generating and motoring a prime mover, such as a gas turbine engine, is shown in FIG. 1A in accordance with an embodiment of the present invention. The system (100) comprises three electrical machines (102), (104) and (106), a prime mover (116), such as gas turbine, and an active and passive power electronics circuit (108). The three electrical machines typically consist of a permanent magnet (PM) generator (106), an exciter salient-pole synchronous machine (104), and main salient-pole synchronous machine (102). The system (100) preferably includes the main machine, or starter/generator (S/G) (102), exciter (104), and PM generator (106) arranged to allow multiple modes of operation, as described below. The system also includes a plural phase converter (110), a first plural phase rectifier (114), a second plural phase rectifier (118) and an exciter regulator (112), where the plural phase converter (110) and the exciter regulator (112) operate in cooperation as the active and passive power electronics circuit (108).

The first plural phase rectifier (114) is electrically coupled to the armature winding (106A) of the PM generator (106) and to the field winding (104B) of exciter (104) via an exciter regulator (112). The second plural phase rectifier (118) is located on the rotor of the main machine (102) and is electrically coupled to the armature winding (104A) of the exciter (104) and to the field winding (102B) of the main machine (102). The plural phase converter (110) is electrically coupled to the armature winding (102A) of the main machine (102), AC load lines (102C) and a DC bus (120).

In the first embodiment of the present invention, the armature (102A) of the main machine (102) is supplied with an AC voltage signal using the plural phase converter (110), and there is no excitation of the main machine field winding (102B). In the second embodiment of the present invention, both the field (102B) and armature (102A) of the main machine (102) are provided excitation signals. The armature (102A) is provided an AC voltage signal from the plural phase converter (110) and the field (102B) is provided a DC voltage signal from the second plural phase rectifier (118).

The DC voltage signal provided by the second plural phase rectifier (118) results from a DC current applied to the field (104B) of the exciter (104). However, zero voltage is induced in the rotor windings of the exciter (104) while the main machine operates at very low speeds. As the speed of the main machine (102) increases, as typically occurs during start-up of a prime mover, voltage is induced in the rotor of the exciter (104), which is applied as a DC voltage signal to the main machine field (102B) via the second plural phase rectifier (118). As speed increases, this applied signal increases, thereby increasing the main field flux of the main machine (102). The components of the system (100) are mechanically and electrically engaged such that the main machine (102), exciter (104) and PM generator (106) may be used in these various combinations to start the prime mover (116). All three machines are assembled on the same shaft mechanically coupled to the prime mover (116) and function in cooperation during three modes of operation.

During the "generation" mode of operation, the permanent magnet machine (106) provides rectified power to the exciter regulator (112), which in turn controls the exciter field current that produces a rotating multi-phase voltage. This multi-phase voltage is rectified to produce a main machine field current and the resultant flux produced by this field current produces a voltage at the stator windings. Regulation of the output voltage is achieved by comparing the output voltage to a pre-determined reference, and adjusting the exciter field winding. During the "motoring" mode of operation, only the exciter (104) and main machine (102) are used, and a battery (not shown) is provided for the input of the exciter field winding. Where a battery is unavailable, the output of the PM generator is used.

Figure 1B:
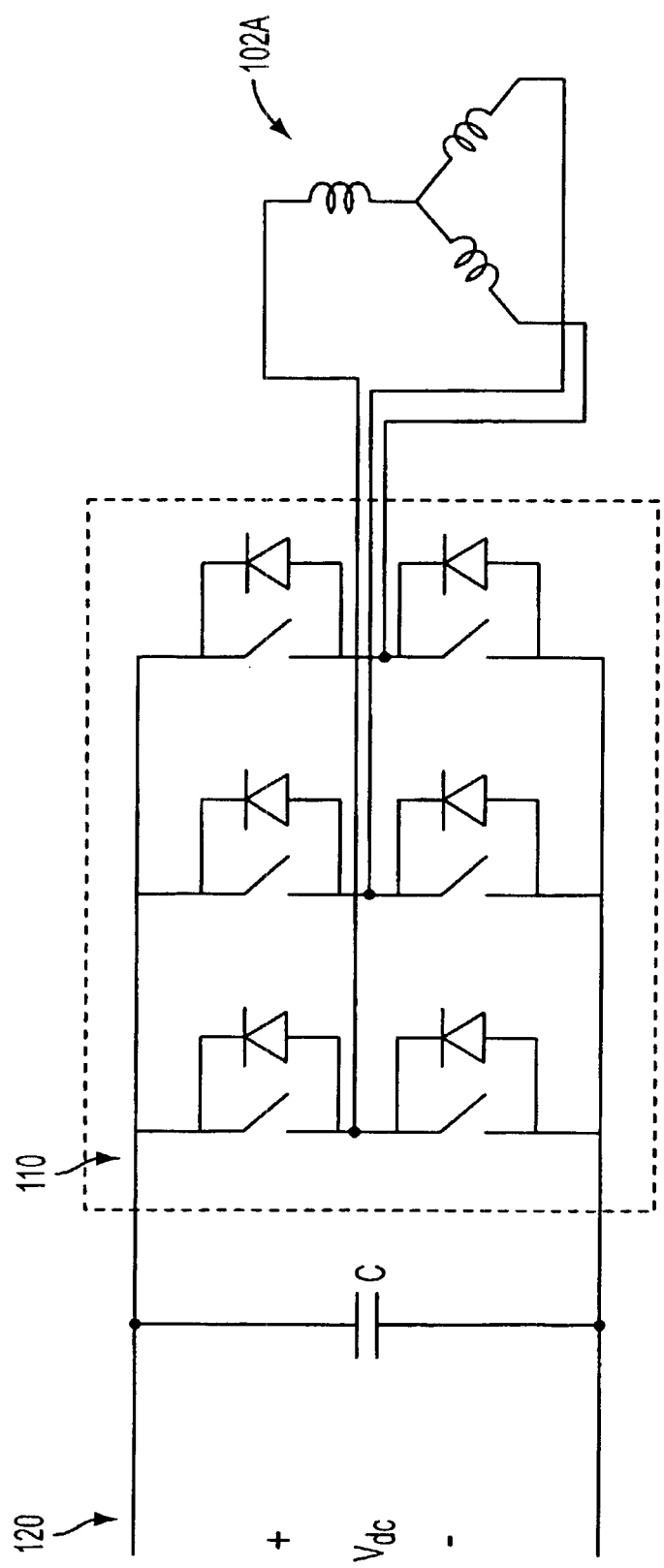
FIG. 1B is a block diagram illustrating an example of the excitation circuit for the main machine armature winding of FIG. 1A in accordance with an embodiment of the present invention.

During "start-up" mode of operation, the armature winding (102A) of the main machine (102) is supplied power by the plural phase converter (110) as shown in FIGS. 1A and 1B. As is known by those skilled in the art, the converter (110) is controlled such that the so called current Park vector produced by current in the three phase windings of the main machine armature (102A), in accompaniment with the spatial distribution of the windings in the machine, is maintained at an optimum angle with respect to the main flux vector of the machine. Park vectors inherently contain information on both the instantaneous magnitudes and the phase relationships of three phase rotating fields with respect to a reference coordinate system. A Park vector in general, is a mathematical representation that describes the locus of an electrical quantity in the complex space domain (where time is a parameter). A current Park vector is defined with the vector's amplitude and the vector's direction in spatial relation to the three phases. A general discussion of Park vectors is provided in P. K. Kovacs, "Transient Phenomena in Electrical Machines", Elsevier Science Publishing Co., and in U.S. Pat. No. 6,301,136 issued to Huggett et al., the entire content of each being incorporated herein by reference.

In the first embodiment of a first starting mode the present invention where only reluctance torque is used, the field winding (104B) of the exciter machine (104) is not supplied by any power source, and as a consequence, there is no flux vector. In this embodiment, only reluctance torque is used to accelerate the turbine (116).

Figure 2:
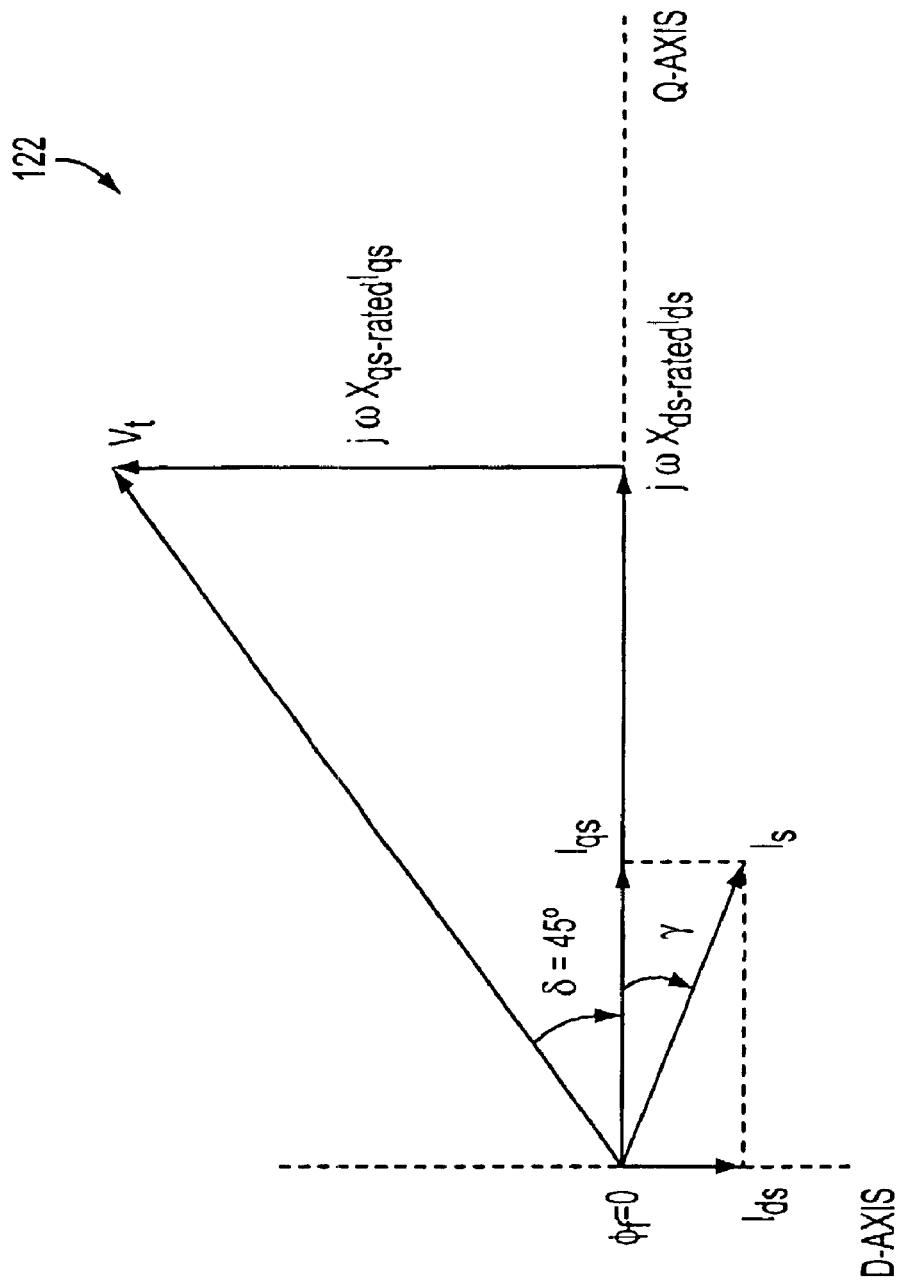
FIG. 2 is a vector diagram illustrating an example of the use of reluctance torque only in the starting system of FIG. 1 according to an embodiment of the present invention.

For the following discussion, reference will be made to FIGS. 1A, 1B and 2, and as necessary, attention will be drawn to a particular figure. FIG. 1B is a block diagram illustrating an example of the excitation circuit for the main machine armature (102A) of FIG. 1A, and FIG. 2 is a vector diagram illustrating an example of the vectorial relationship between the terminal voltage, and d- and q- axis impedance drops in the main machine (102).

In the first embodiment of the first starting mode of the present invention, only reluctance torque of the main machine (102) is used to achieve start-up of the prime mover (116). As known to those skilled in the art, a salient pole synchronous machine is doubly excited, with electrical energy supplied to both the field and the armature windings. A DC voltage is typically applied to the field winding located on the rotor, and an AC current is applied to the armature winding located on the stator.

In the first embodiment of the first starting mode of the present invention, an AC current provided by the plural phase converter (110) is applied to the armature winding (102A) of the main machine (102). If the AC current is controlled such that the d- and q- axis impedance drops are equal in amplitude, the terminal voltage may be maintained at a selected angle to the q-axis, for example, 45 degrees as shown in FIG. 2. This is the optimum configuration for producing maximum reluctance torque per ampere of stator excitation, without any main field (102B) excitation.

Torque may be produced in a doubly excited synchronous machine such as (102) even though only the armature winding is energized because of the change of reluctance with rotor position. In the first embodiment, the per unit reluctance torque of the main machine (102), defined below in equation (1) neglecting the resistance of the winding, is capable of generating adequate torque T to accelerate the turbine (116) of FIG. 1A.

$$T = -\frac{1}{\omega}\left(\sin 2\delta \frac{(X_d - X_q)V^2}{2X_d X_q}\right) \quad (1)$$

Where $\omega$ is the per unit angular velocity of the rotor, $\delta$ is the load angle, $X_d$ is the per unit d-axis synchronous reactance, $X_q$ is the per unit q-axis synchronous reactance and $V^2$ is the square of the per unit voltage (as the starting torque varies as the square of the voltage).

As shown in the vector diagram (122) of FIG. 2, the terminal voltage may be maintained at a selected angle to the q-axis. In a first control option of the first embodiment, the load angle $\delta$, consisting of the angle between the q-axis current and terminal voltage of the main machine (102), is maintained at a selected angle to the q-axis, for example 45 electrical degrees, to maximize the reluctance torque delivered by the main machine (102). This provides simplicity as no field excitation of the exciter machine (104) or additional control for field adjustments are required. As known to those skilled in the art, a separate single phase converter (not shown) is required to provide an AC field current to the field winding (104B) of the exciter (104). Additionally, a separate DC bus can also be required to provide higher DC voltage levels to the exciter regulator (112) during periods when the PM generator (106) is operating at low speeds.

The control system to implement this requires knowledge of the rotor position, and further requires the current vector applied to the armature winding (102A) of the main machine (102) to be maintained at a fixed angle with respect to the rotor position. One example of such a control system is presented in FIG. 5 and discussed in greater detail below.

Figure 5:
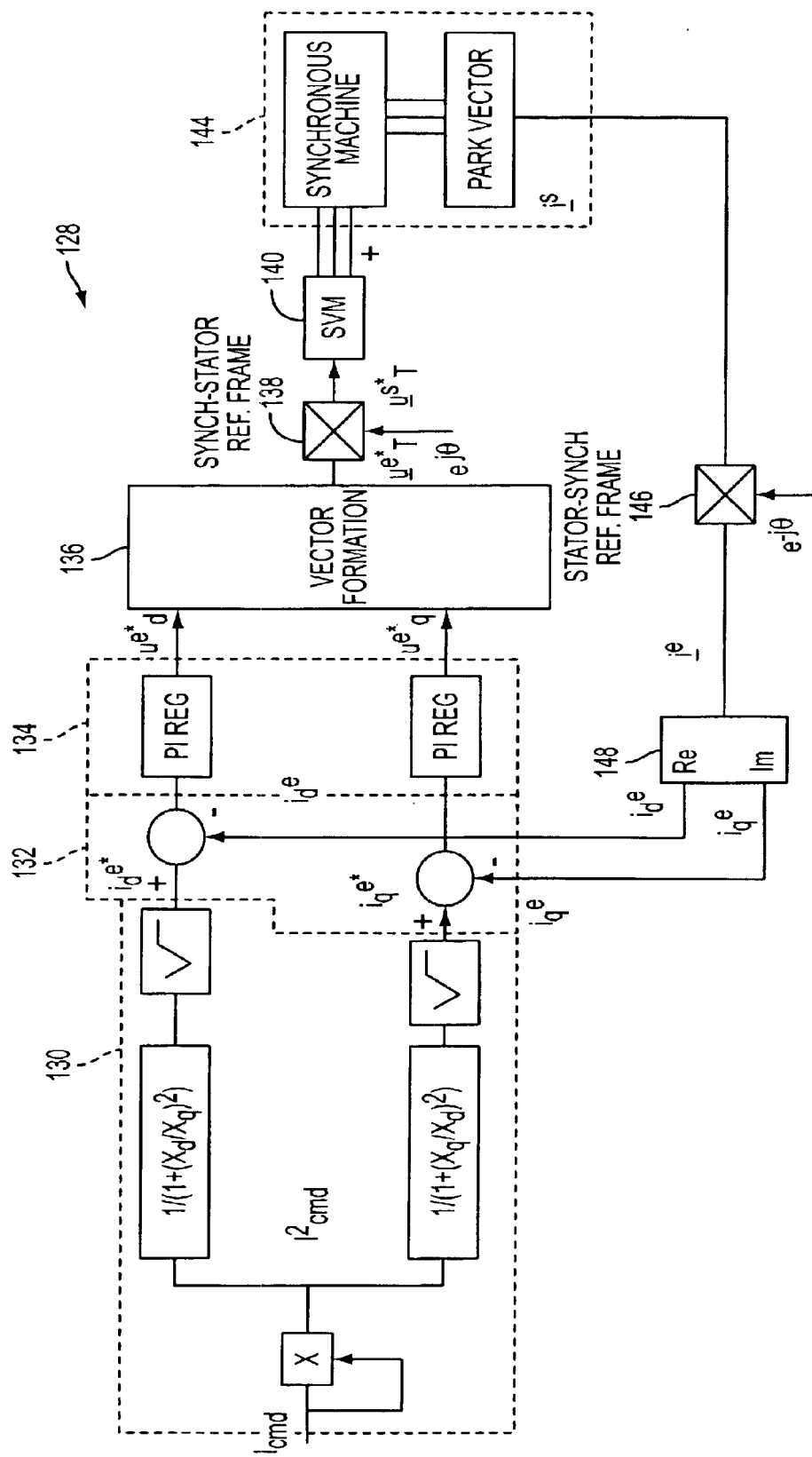
FIG. 5 is a block diagram illustrating an example of a first control option for excitation for the main machine.

In FIG. 5, a control block diagram of a controller 128 is shown. Block (130) takes the Park vector of phase current command ($I_{cmd}$) and provides the d-axis and q-axis components of the vector of the phase current all in a synchronous reference frame. Each separate component is processed by a summing means, block (132) which sums the d-axis component of the Park vector of the phase current command and the negative of the d-axis component of the Park vector of the phase current feedback, both in the synchronous reference frame. In a like fashion, block (132) also sums the q-axis component of the Park vector of the phase current command and the negative of the q-axis component of the Park vector of the phase current feedback, both in the synchronous reference frame.

The signals are then processed by block (134), a Proportional Integral (PI) regulator which applies the d-axis of the Park vector of the terminal voltage command in the synchronous reference frame using the output of the summing block (132) as an input to PI regulator (134). The vector summation block (136) constructs the Park vector of the terminal voltage command using the d- and q- axis voltage components all in a synchronous reference frame. The multiplier, block (138) multiplies the constructed Park vector of the terminal voltage in a synchronous reference frame with $e^{+j\theta}$ to obtain the Park vector of the terminal voltage command in a stationary reference frame.

A pulse width modulated control block (140) using, for example, Space Vector Modulation (SVM), represents the power converter (110) which essentially produces the pulse width modulated three phase voltages as applied to the main machine (102) in FIG. 1.

Figure 6:
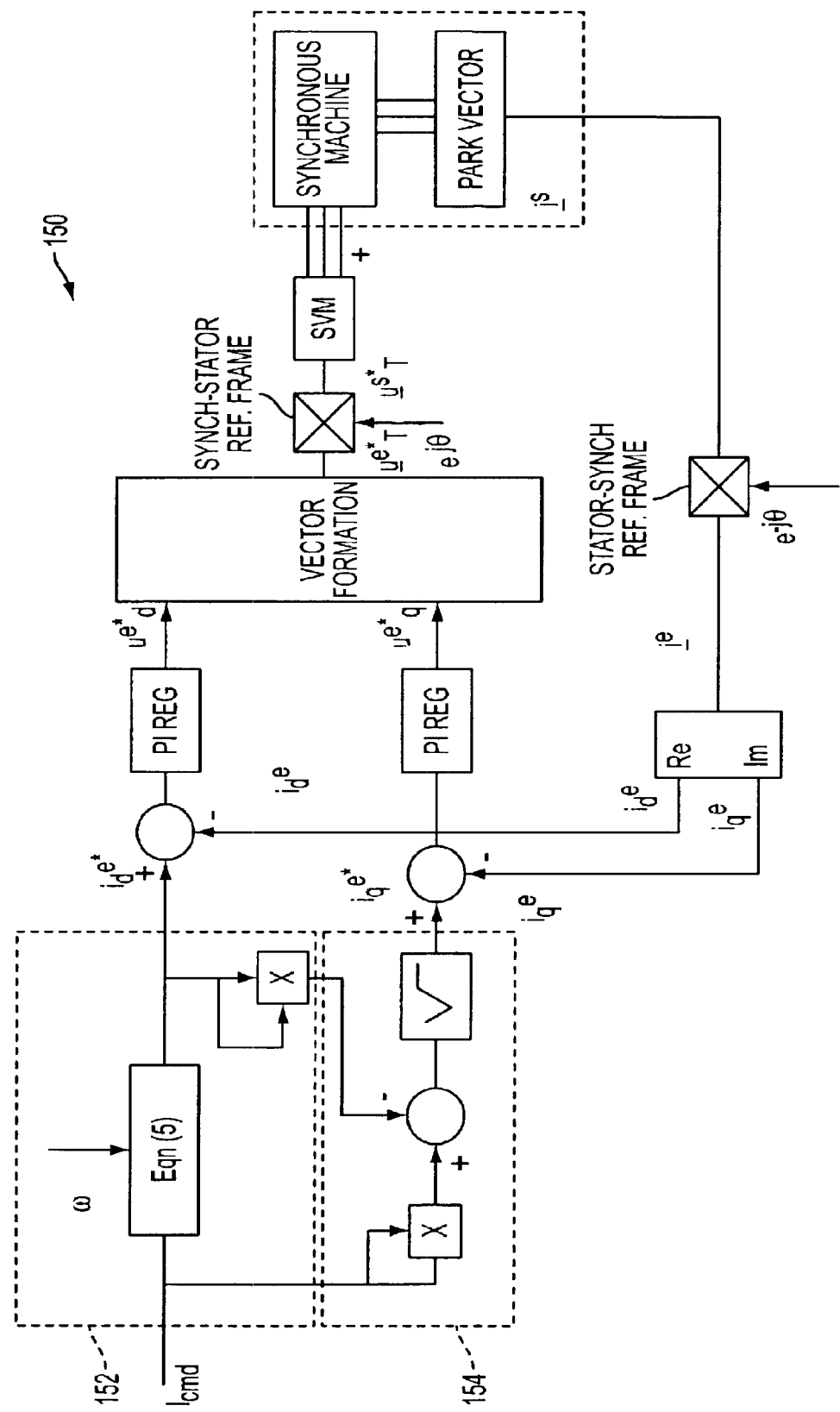
FIG. 6 is a block diagram illustrating an example of a second control option for excitation for the main machine.

The Park vector of the phase current in a stationary reference frame ($i^s$) can be constructed using the three phase currents, as shown in block (144) of FIGS. 5 and 6. Typically only two phase currents are measured and the Park vector (also called the space vector) of the phase current in stationary reference frame is obtained by using the following equation (2), $$i^s = \tfrac{2}{3}(i_a + a\, i_b + a^2 i_c) = i^s_d + j\, i^s_q \quad (2)$$

where the complex constants are $a = e^{j2\pi/3}$ and $a^2 = e^{j4\pi/3}$. The Park vector of the phase current in a stationary reference frame is transferred to synchronous reference frame by multiplying $e^{-j\theta}$ using a multiplier at block (146). Block (148) then takes the Park vector of the current in synchronous reference frame and outputs d-axis and q-axis components in synchronous reference frame. In this case, rotor position information is sensed through rotor sensors, however, as known to those skilled in the art, a "sensorless" rotor scheme can also be used where rotor speed information and corresponding angle $\theta_{est}$ are estimated, and used for the reference frame transformations.

During operation of the control block diagram 128 in FIG. 5, an input command of the Park vector of phase current $I_{cmd}$ is divided into two components, $I_d$ and $I_q$ such that the d- and q- axis voltage drop terms are equal as in equation (3), that is, $$I_d^* X_d = I_q^* X_q \tag{3}$$

Each current command is compared to its own feedback current, and the error signal is operated upon by the Proportional Integral (PI) regulator. The output of the current regulators is then assembled into a vector to form the Park vector of the terminal voltage, and transformed back to the stationary reference frame by multiplying the voltage vector by the unit vector $e^{+j\theta}$, where theta is the angle of the rotor as defined by the radial line of the rotor passing through the center of the salient pole and the center line of the "A" phase stator coil. This serves to eliminate the need for a single phase converter to provide an AC field current to the field winding (104B) of the exciter (104). Therefore, by removing the need for an additional converter for applying AC to the field winding (104B) of the exciter machine (104), the complexity of the system (100) is reduced and a higher mean time between failures value for the overall system can be achieved. Additional benefits include a decreased overall space requirement for supporting electronics, as well as elimination of additional weight and heat generation.

In a second embodiment of the second starting mode of the present invention, the reluctance torque of the main machine (102) as described above is used in a first starting stage, and after some rotation of the main rotor is achieved, a DC current is applied to the field winding (104B) of the exciter (104) in a second stage. As pointed out above, the DC current may be applied at any time during start-up, including directly at start-up. The DC voltage applied to the field winding (104B) of the exciter can be either fixed, or variable. Where the voltage is fixed, the three phase voltage is increased in the armature winding (104A) of the exciter (104) as the speed of the exciter rotor increases. Where the voltage is variable, a high voltage can be applied initially, however as exciter rotor speed increases, the applied DC voltage can be reduced to prevent excessive AC voltages in the exciter armature winding (104A).

As the speed of the main machine (102) increases, voltage is induced in the rotor of the exciter (104), which is applied to the second plural phase rectifier (118). This provides a DC voltage signal to the field (102B) of the main machine (102). As speed increases, this applied DC voltage signal increases, increasing the main field flux. Alternatively, this applied DC voltage signal can be provided by a DC source, such as a battery, fuel cell, or other device adaptable to the system, during periods where the exciter (104) and the second plural phase rectifier (118) are providing an insufficient DC voltage signal.

Figure 1C:
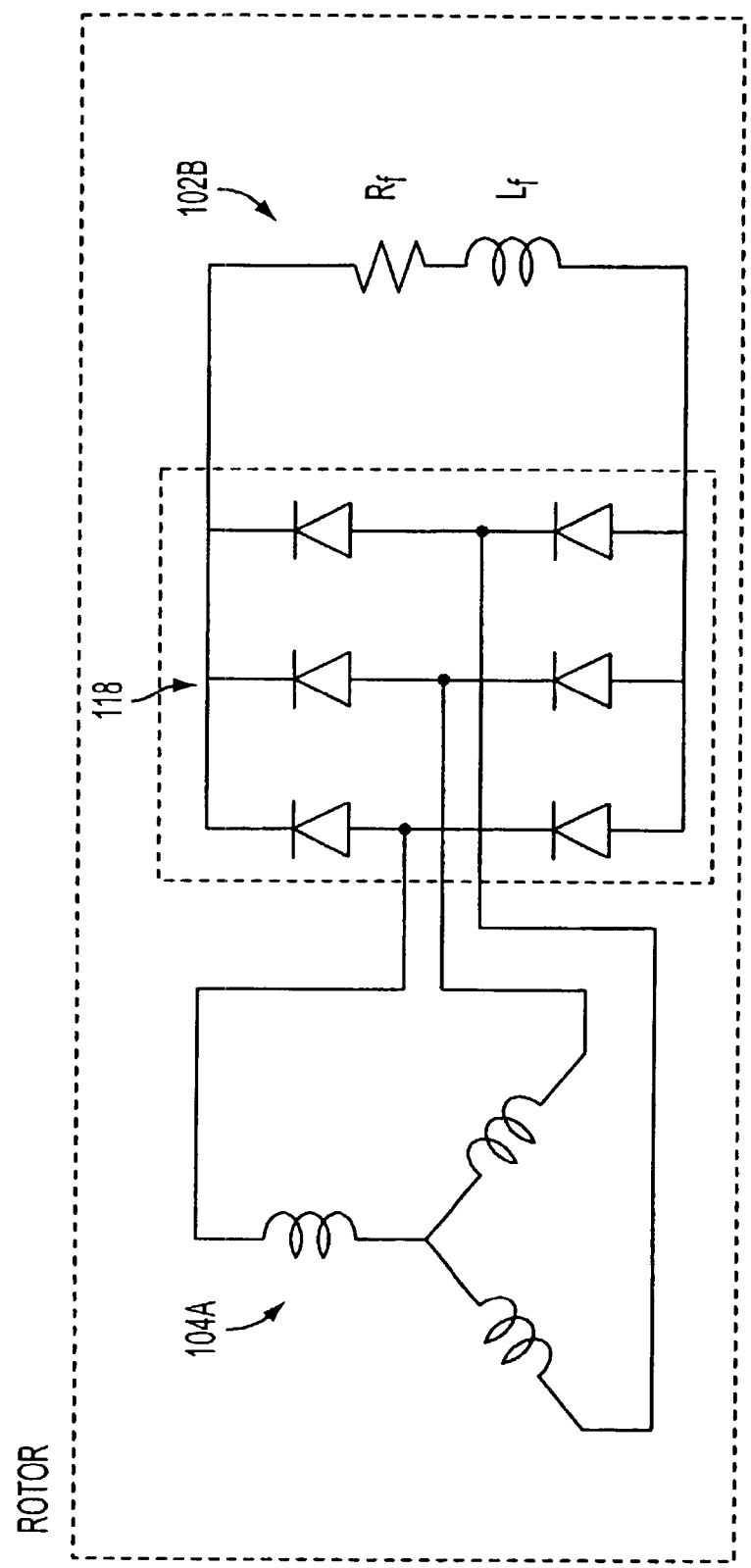
FIG. 1C is a block diagram illustrating an example of a the excitation circuit for the main machine field winding of FIG. 1A in accordance with an embodiment of the present invention.

To illustrate the second embodiment of the present invention described above, reference will be made to FIGS. 1–4, and as necessary, attention will be drawn to a particular figure. FIG. 1C is a block diagram illustrating an example of a the excitation circuit for the main machine field (102B) of FIG. 1A, FIG. 3 is a vector diagram illustrating an example of the use of reaction and reluctance torque in the starting system (100) of FIG. 1 where the internal angle γ is less than zero, and FIG. 4 is a graph illustrating the use of reaction and reluctance torque in the starting system (100) of FIG. 1 where γ is greater than zero, each according to an embodiment of the present invention.

A first control option for the second embodiment described above includes maintaining a load angle δ fixed at a selected angle, such as 45 degrees, and starting in the first stage with reluctance torque, and thereafter, applying reaction torque in a second stage. In this control option, the main machine (102) produces both reluctance and reaction torque T, defined in equation (4).

$$T = -\frac{1}{\omega}\left(\sin\delta\frac{E_1 V_2}{X_d} + \sin 2\delta\frac{V^2(X_d - X_q)}{2X_d X_q}\right) \tag{4}$$

Figure 3:
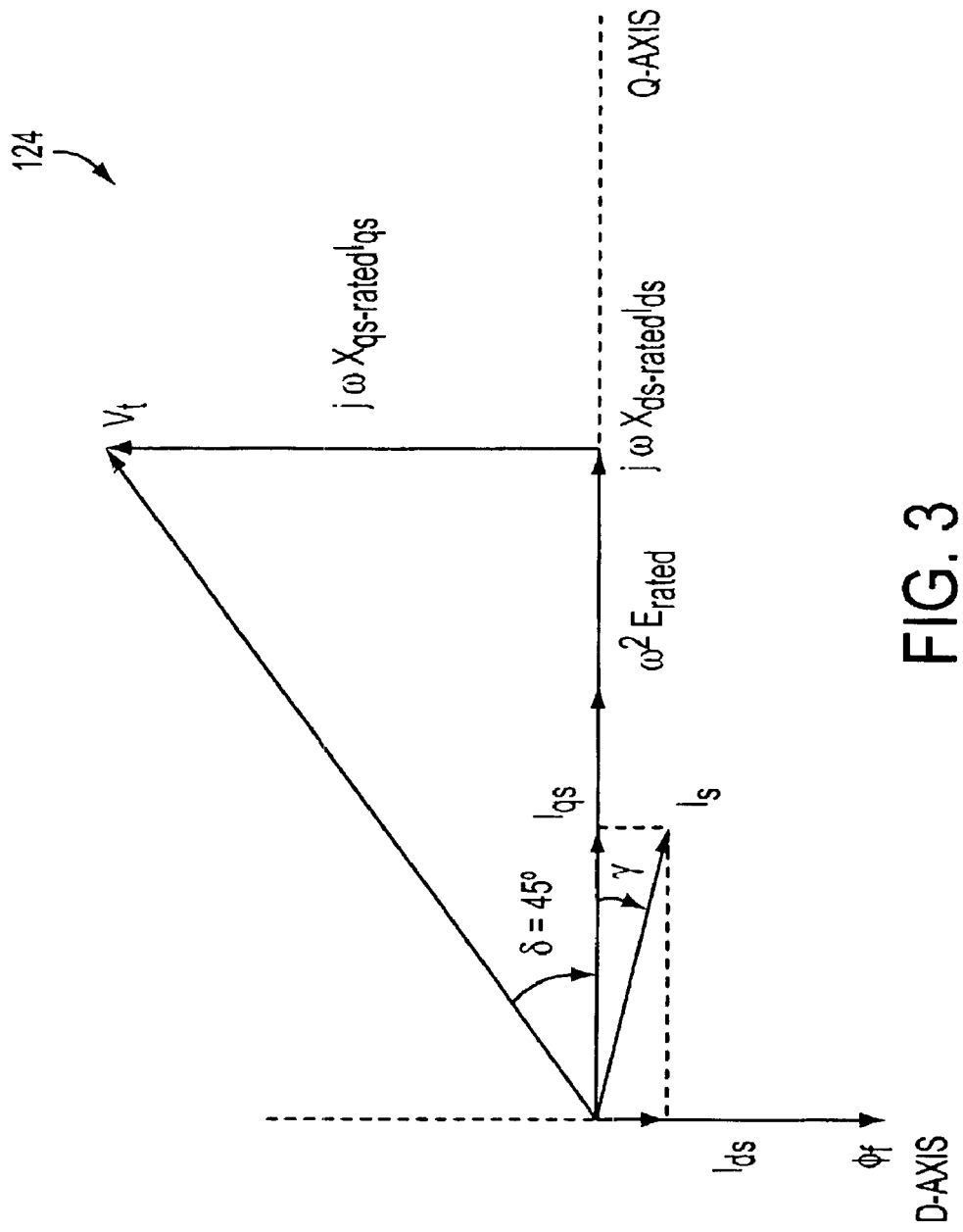
FIG. 3 is a vector diagram illustrating an example of the use of reaction and reluctance torque in the starting system of FIG. 1 where the internal angle γ is less than zero, according to an embodiment of the present invention.
Figure 4:
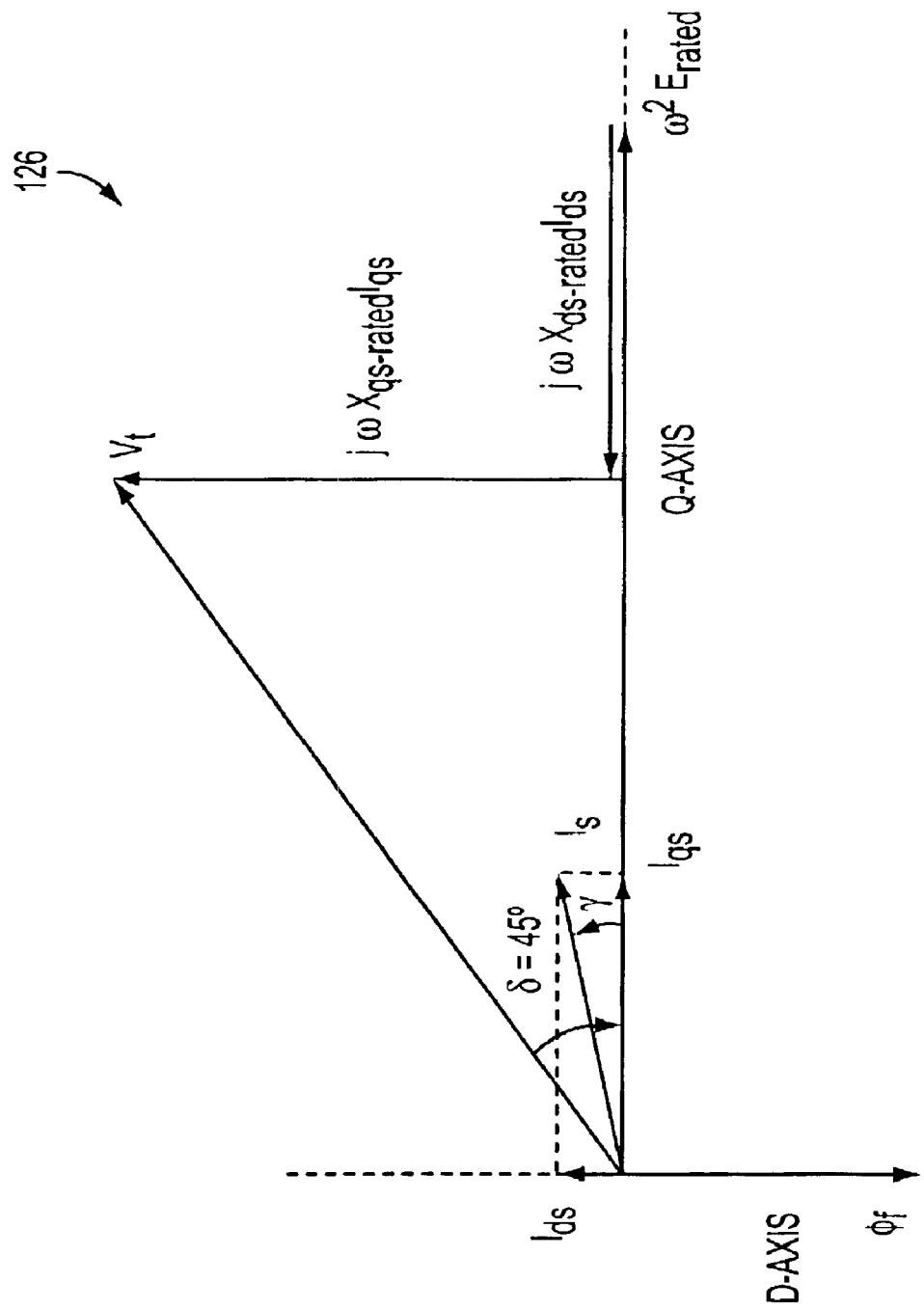
FIG. 4 is a graph illustrating an example of the use of reaction and reluctance torque in the starting system of FIG. 1 where γ is greater than zero, according to an embodiment of the present invention.

As shown in FIGS. 3 and 4, the load angle δ of the main machine (102) can be kept at 45 degrees until the required terminal voltage of the main machine exceeds the voltage available from the plural phase converter (110). Once this condition is achieved the load angle δ can be reduced to keep the terminal voltage equal to the rated converter voltage.

A second control option for the second embodiment described above includes starting with a selected load angle δ, such as 45 degrees, and reluctance torque only as in the first control option. However, as the main machine (102) speeds up, the load angle can be adjusted to maximize the torque production according to equation (4). FIG. 6 represents the modified block diagram of a controller shown in FIG. 5 to enable this control strategy. This strategy is based upon maintaining the equality given in equation (5).

$$\omega^2 E_{rated} + X_d I_d = X_q I_q \tag{5}$$

Substituting in $I_q = \sqrt{(I_{cmd}^2 - I_d^2)}$ in equation (5) above yields the quadratic equation (6) below, $$(X_d^2 + X_q^2)I_d^2 + 2\omega^2 E_{rated} X_d I_d + \omega^4 E^2 - X_q^2 I_{cmd}^2 = 0 \tag{6}$$

The d-axis current can be found by using this quadratic equation solution (7).

$$I_{d1d2} = \frac{-2\omega^2 E_{rated} X_d \pm \sqrt{(2\omega^2 E_{rated} X_d)^2 - 4(X_d^2 + X_q^2)(\omega^4 E^2 - X_q^2 I_{cmd}^2)}}{2(X_d^2 + X_q^2)} \tag{7}$$

Only $i_{d1}$ or $i_{d2}$ is used, as only one represents the realistic solution. Once the d-axis current is found, the q-axis current can be found from equation (8).

$$I_q = \sqrt{I^2 - I_d^2} \tag{8}$$

The control system to implement this control option requires knowledge of the rotor speed, position, and further requires the current vector applied to the stator windings of the machine be maintained at a fixed angle with respect to the rotor position. One example of such a control system is presented in FIG. 8 and discussed in greater detail below.

In FIG. 6, a control block diagram of a controller 150 is shown. In FIG. 6, an input command of the Park vector of the phase current $I_{cmd}$ is divided into two components, $I_d$ and $I_q$ in synchronous reference frame such that the equations (7) and (8) are satisfied. These reference commands are subtracted from their respective feedback values in the synchronous reference frame and the error of respective quantities are fed to respective current regulator in the synchronous reference frame. The operation of control block 150 is identical to the operation of control block 128 of FIG. 5 described above with the following exceptions. In FIG. 6, block (152) receives the Park vector of the phase current command in a synchronous reference frame and speed feedback, and produces the d-axis component of the Park vector of the phase current in a synchronous reference frame. Block (154) receives the Park vector of the phase current command and the d-axis component of the Park vector of phase current, both in a synchronous reference frame, and outputs the q-axis component of the Park vector of the phase current in a synchronous reference frame. The remaining control scheme is the same as described above for FIG. 5.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in following claims.

What is claimed is:

1. A method of using a synchronous starter/generator to apply a torque to a prime mover until said prime mover is substantially self-sustaining, said method comprising:

selecting a first or second starting mode, said first mode comprising applying a reluctance torque output from a synchronous starter/generator to a prime mover until said prime mover is substantially self-sustaining, said second mode comprising applying a reluctance torque output from said synchronous starter/generator to said prime mover in a first stage, and applying at least one of a reluctance torque output and a reaction torque output from said synchronous starter/generator to said prime mover in a second stage until said prime mover is substantially self-sustaining, and in response to said selection;

controlling said synchronous starter/generator in said first mode to produce a reluctance torque output and applying said reluctance torque output to said prime mover until said prime mover is substantially self-sustaining; and controlling said synchronous starter/generator in said second mode to produce at least one of a reluctance torque output and a reaction torque output and applying said at least one of a reluctance torque output and a reaction torque output to said prime mover in said first and second stage until said prime mover is substantially self sustaining.

2. A method of using a synchronous starter/generator as claimed in claim 1, wherein said controlling said synchronous starter/generator in said first mode comprises:

controlling a plural phase converter to apply a first modulated signal to an armature winding of said starter/generator in said first mode, and in response, controlling said starter/generator to produce said reluctance torque output, and apply said reluctance torque output to said prime mover until said prime mover is substantially self-sustaining, said first modulated signal having a terminal voltage Park vector and a current Park vector comprising a q-axis and a d-axis current vector component; and controlling a floating frame controller to generate a current Park control vector, and use said current Park control vector to control said plural phase converter during modulation of said first modulated signal.

3. A method of using a synchronous starter/generator as claimed in claim 2, wherein said controlling said synchronous starter/generator in said first mode further comprises:

controlling said plural phase converter to maintain a load angle at a first angle value in said first mode, said load angle comprising an angle between said q-axis current vector component and said terminal voltage Park vector of said first modulated signal.

4. A method of using a synchronous starter/generator as claimed in claim 3, wherein said first angle value in said first mode is selectable to maximize said reluctance torque output.

5. A method of using a synchronous starter/generator as claimed in claim 3, wherein said first angle value in said first mode is 45 electrical degrees.

6. A method of using a synchronous starter/generator as claimed in claim 3, wherein said first angle value in said first mode is maintained at a fixed angle with respect to a first rotor position of said synchronous starter/generator.

7. A method of using a synchronous starter/generator as claimed in claim 1, wherein said controlling said synchronous starter/generator in said second mode comprises:

controlling a plural phase converter to apply a second modulated signal to an armature winding of said starter/generator in said first and second stages of said second mode, and in response, controlling said starter/generator to produce said reluctance torque output, and apply said reluctance torque output to said prime mover during said first and second stages, said second modulated signal having a terminal voltage Park vector and a current Park vector comprising a q-axis and a d-axis current vector component; and controlling an exciter circuit to apply a third signal to a field winding of said starter/generator in said second stage of said second mode, and in response controlling said starter/generator to produce said reaction torque output, and apply said reluctance torque output to said prime mover during said second stage until said prime mover is substantially self-sustaining; and controlling a floating frame controller to generate a current Park control vector in a synchronous reference frame, and use said current Park control vector to control said plural phase converter during modulation of said second modulated signal.

8. A method of using a synchronous starter/generator as claimed in claim 7, wherein said controlling said plural phase converter for said first and second stage comprises:

controlling said three phase power converter to maintain a load angle at a second angle value in said second mode while said synchronous starter/generator operates below a first rotational speed value, said load angle comprising an angle between said q-axis current vector component and said terminal voltage Park vector of said second modulated signal; and controlling said three phase power converter to adjust said second angle value to maximize torque production while said synchronous starter/generator operates at or above said first rotational speed.

9. A method of using a synchronous starter/generator as claimed in claim 8, wherein said first rotational speed value in said second mode is selectable.

10. A method of using a synchronous starter/generator as claimed in claim 8, wherein said second angle value in said second mode is selectable to maximize said reluctance torque output.

11. A method of using a synchronous starter/generator as claimed in claim 8, wherein said second angle value in said second mode is 45 electrical degrees.

12. A method of using a synchronous starter/generator as claimed in claim 7, wherein said controlling said plural phase converter for said first and second stage comprises:
controlling said three phase power converter to maintain a load angle at a third angle value in said second mode until a required terminal voltage value of said synchronous starter/generator exceeds a maximum voltage value provided by said plural phase converter, said load angle comprising the angle between said q-axis current vector component and said terminal voltage Park vector of said second modulated signal; and
controlling said three phase power converter to adjust said third angle value to maintain said required terminal voltage value at or below said maximum voltage value provided by said plural phase converter when said required terminal voltage value of said synchronous starter/generator exceeds said maximum voltage value provided by said plural phase converter.

13. A method of using a synchronous starter/generator as claimed in claim 1, wherein said first and second stages of said second mode can overlap.

14. An apparatus for applying a torque to a prime mover until said prime mover is substantially self-sustaining, comprising:
a first controller, adapted to select a first or second starting mode, said first mode comprising applying a reluctance torque output from a synchronous starter/generator to a prime mover until said prime mover is substantially self-sustaining, said second mode comprising applying a reluctance torque output from said synchronous starter/generator to said prime mover in a first stage, and applying at least one of a reluctance torque output and a reaction torque output from said synchronous starter/generator to said prime mover in a second stage until said prime mover is substantially self-sustaining;
said first controller, further adapted to control said synchronous starter/generator in said first mode to produce a reluctance torque output, and apply said reluctance torque output to said prime mover until said prime mover is substantially self-sustaining, said first controller electrically coupled to said synchronous starter/generator, said synchronous starter/generator comprising a stator having an armature winding, and a rotor having a field winding; and
said first controller, further adapted to control said synchronous starter/generator in said second mode to produce at least one of a reluctance torque output and a reaction torque output, and apply said at least one of a reluctance torque output and a reaction torque output to said prime mover in said first and second stage until said prime mover is substantially self sustaining.

15. An apparatus for applying a torque to a prime mover as claimed in claim 14, wherein said first controller comprises:

a plural phase converter, adapted to apply a first modulated signal to said armature winding of said starter/generator in said first mode, and in response, said starter/generator is adapted to produce said reluctance torque output, and apply said reluctance torque output to said prime mover until said prime mover is substantially self-sustaining, said first modulated signal having a terminal voltage Park vector and a current Park vector, said current Park vector comprising a q-axis and a d-axis current vector component; and
a floating frame controller, adapted to generate a current Park control vector, and use said current Park control vector to control said plural phase converter during modulation of said first modulated signal.

16. An apparatus for applying a torque to a prime mover as claimed in claim 15, wherein said plural phase converter comprises:
a three phase power converter, adapted to maintain a load angle at a first angle value in said first mode, said load angle comprising an angle between said q-axis current vector component and said terminal voltage Park vector of said first modulated signal.

17. An apparatus for applying a torque to a prime mover as claimed in claim 16, wherein said first angle value in said first mode is selectable to maximize said reluctance torque output.

18. An apparatus for applying a torque to a prime mover as claimed in claim 16, wherein said first angle value in said first mode is 45 electrical degrees.

19. An apparatus for applying a torque to a prime mover as claimed in claim 16, wherein said three phase power converter is adapted to maintain said first angle value in said first mode at a fixed angle with respect to a first rotor position of said synchronous starter/generator.

20. An apparatus for applying a torque to a prime mover as claimed in claim 15, wherein said first controller further comprises:
said plural phase converter, further adapted to apply a second modulated signal to said armature winding of said starter/generator in said first and second stages of said second mode, and in response, said starter/generator is further adapted to produce said reluctance torque output, and apply said reluctance torque output to said prime mover during said first and second stages, said second modulated signal having a terminal voltage Park vector and a current Park vector comprising a q-axis and a d-axis current vector component;
an exciter circuit, adapted to apply a third signal to a field winding of said starter/generator in said second stage of said second mode, and in response, said starter/generator is further adapted to produce said reaction torque output, and apply said reaction torque output to said prime mover during said second stage until said prime mover is substantially self-sustaining; and
said floating frame controller, further adapted to generate a current Park control vector in a synchronous reference frame, and use said current Park control vector to control said plural phase converter during modulation of said second modulated signal.

21. An apparatus for applying a torque to a prime mover as claimed in claim 20, wherein said plural phase converter comprises:
a three phase power converter, adapted to maintain a load angle at a second angle value in said second mode while said synchronous starter/generator operates below a first rotational speed value, said load angle comprising an angle between said q-axis current vector component and said terminal voltage Park vector of said second modulated signal; and said three phase power converter, further adapted to adjust said second angle value to maximize torque production while said synchronous starter/generator operates at or above said first rotational speed.

22. An apparatus for applying a torque to a prime mover as claimed in claim 20, wherein said plural phase converter comprises:

a three phase power converter, adapted to maintain a load angle at a third angle value in said second mode until a required terminal voltage value of said synchronous starter/generator exceeds a maximum voltage value provided by said plural phase converter, said load angle comprising an angle between said q-axis current vector component and said terminal voltage Park vector of said second modulated signal; and said three phase power converter, further adapted to adjust said third angle value to maintain said required terminal voltage value at or below said maximum voltage value provided by said plural phase converter when said required terminal voltage value of said synchronous starter/generator exceeds said maximum voltage value provided by said plural phase converter.

* * * * *